United States Patent
Kim et al.

(10) Patent No.: US 12,485,918 B2
(45) Date of Patent: Dec. 2, 2025

(54) VEHICULAR DRIVING ASSISTANCE SYSTEM WITH ENHANCED ROAD CURVE MANAGEMENT

(71) Applicant: Magna Electronics Inc., Auburn Hills, MI (US)

(72) Inventors: SeHwan Kim, Troy, MI (US); Sasi Preetham Devarasetty, Union City, CA (US); Tejas Murlidhar Varunjikar, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 83 days.

(21) Appl. No.: 18/612,260

(22) Filed: Mar. 21, 2024

(65) Prior Publication Data

US 2024/0317256 A1    Sep. 26, 2024

Related U.S. Application Data

(60) Provisional application No. 63/491,556, filed on Mar. 22, 2023.

(51) Int. Cl.
| | |
|---|---|
| *B60W 40/072* | (2012.01) |
| *B60R 11/04* | (2006.01) |
| *B60W 30/14* | (2006.01) |
| *B60W 60/00* | (2020.01) |
| *G06V 10/80* | (2022.01) |

(Continued)

(52) U.S. Cl.
CPC ........... *B60W 60/001* (2020.02); *B60R 11/04* (2013.01); *B60W 30/146* (2013.01); *G06V 10/80* (2022.01); *G06V 20/588* (2022.01); *B60R 2011/0026* (2013.01); *B60R 2300/804* (2013.01); *B60W 2420/403* (2013.01); *B60W 2520/125* (2013.01); *B60W 2552/20* (2020.02); *B60W 2552/53* (2020.02); *B60W 2556/00* (2020.02);

(Continued)

(58) Field of Classification Search
CPC .............. B60W 30/12; B60W 40/072; B60W 2552/53; B60W 2552/30; B60W 2554/801; G06V 20/588; B62D 6/002; B62D 6/00; G06T 2207/30256

See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Kenneth J Malkowski
(74) *Attorney, Agent, or Firm* — HONIGMAN LLP

(57) ABSTRACT

A vehicular driving assist system includes a camera disposed at a vehicle. The system, while the equipped vehicle is traveling along a traffic lane, determines lane markings of the traffic lane. The system determines curvature of the traffic lane based on (i) curvature of the determined lane markings and (ii) map data representative of a current geographical location of the vehicle. The system, based at least in part on the determined curvature, determines a target velocity profile that establishes a target lateral velocity for the vehicle to follow as the vehicle travels along the traffic lane of the road. Based at least in part on the determined target velocity profile, the system decelerates the vehicle to follow the target velocity profile as the vehicle travels along the traffic lane of the road while lateral acceleration of the equipped vehicle remains below a maximum allowable lateral acceleration.

22 Claims, 2 Drawing Sheets

(51) Int. Cl.
*G06V 20/56* (2022.01)
*B60R 11/00* (2006.01)
*G06V 10/147* (2022.01)

(52) U.S. Cl.
CPC . *B60W 2720/103* (2013.01); *B60W 2720/106* (2013.01); *G06V 10/147* (2022.01)

(56) References Cited

U.S. PATENT DOCUMENTS

| | | |
|---|---|---|
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 8,694,224 B2 | 4/2014 | Chundrlik, Jr. et al. |
| 9,376,060 B2 | 6/2016 | McMahon et al. |
| 10,071,687 B2 | 9/2018 | Ihlenburg et al. |
| 10,099,614 B2 | 10/2018 | Diessner |
| 10,157,322 B1 | 12/2018 | Divekar et al. |
| 10,406,981 B2 | 9/2019 | Chundrlik, Jr. et al. |
| 10,688,993 B2 | 6/2020 | Johnson et al. |
| 10,839,233 B2 | 11/2020 | Lynam et al. |
| 11,142,200 B2 | 10/2021 | Laurent |
| 11,312,353 B2 | 4/2022 | Johnson et al. |
| 11,847,836 B2 | 12/2023 | Schofield et al. |
| 11,958,424 B2 | 4/2024 | Ustunel |
| 12,036,990 B2 | 7/2024 | Joseph et al. |
| 2020/0207348 A1* | 7/2020 | Sato .................... B60W 10/20 |
| 2022/0306150 A1* | 9/2022 | Inoue ................. B60W 40/072 |
| 2023/0099678 A1* | 3/2023 | Omagari ............ B60W 60/001 701/25 |
| 2023/0294692 A1* | 9/2023 | Ueyama ............. B60W 30/143 701/93 |
| 2025/0102667 A1 | 3/2025 | Ellis |

\* cited by examiner

VEHICULAR DRIVING ASSISTANCE SYSTEM WITH ENHANCED ROAD CURVE MANAGEMENT

CROSS REFERENCE TO RELATED APPLICATION

The present application claims the filing benefits of U.S. provisional application Ser. No. 63/491,556, filed Mar. 22, 2023, which is hereby incorporated herein by reference in its entirety.

FIELD OF THE INVENTION

The present invention relates generally to a vehicle sensing system for a vehicle and, more particularly, to a vehicle sensing system that utilizes one or more sensors such as cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular driving assist system includes a camera disposed at a vehicle equipped with the vehicular driving assist system and viewing forward of the equipped vehicle. The camera is operable to capture image data. The camera includes a CMOS imaging array that includes at least one million photosensors arranged in rows and columns. The system includes an electronic control unit (ECU) with electronic circuitry and associated software. Image data captured by the camera is transferred to and is processed at the ECU. The electronic circuitry of the ECU includes an image processor operable to process image data captured by the camera and transferred to the ECU. The vehicular driving assist system, while the equipped vehicle is traveling along a traffic lane of a road and responsive to processing at the ECU of image data captured by the camera and transferred to the ECU, determines lane markings of the traffic lane of the road along which the equipped vehicle is traveling. The vehicular driving assist system determines curvature of the traffic lane of the road ahead of the equipped vehicle based on (i) curvature of the determined lane markings and (ii) map data representative of a current geographical location of the equipped vehicle. The vehicular driving assist system, based at least in part on the determined curvature of the traffic lane of the road ahead of the equipped vehicle, determines a target velocity profile that establishes a target lateral velocity for the equipped vehicle to follow as the equipped vehicle travels along the traffic lane of the road. Based at least in part on the determined target velocity profile, the vehicular driving assist system decelerates the equipped vehicle to follow the target velocity profile as the equipped vehicle travels along the traffic lane of the road. Lateral acceleration of the equipped vehicle, as the equipped vehicle travels along the traffic lane of the road following the target velocity profile, remains below a maximum allowable lateral acceleration.

These and other objects, advantages, purposes and features of the present invention will become apparent upon review of the following specification in conjunction with the drawings.

DESCRIPTION OF THE PREFERRED EMBODIMENTS

Figure 1:
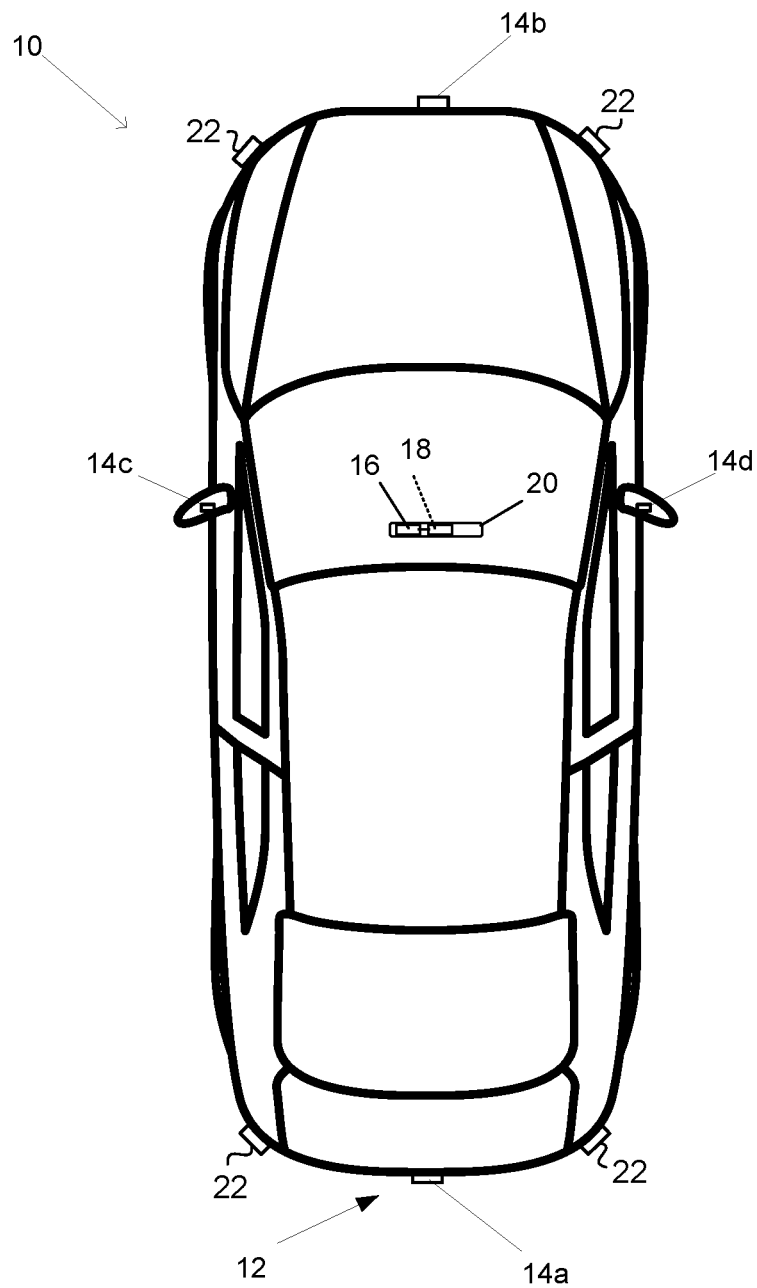
FIG. 1 is a plan view of a vehicle with a vehicular driver assist system that incorporates cameras.

Advanced Driver Assistance Systems (ADAS) are a group of safety and comfort features that assist the driver in performing a variety of tasks while driving the vehicle. ADAS perceive the environment around the vehicle through a combination of sensors such as camera, radar, lidar, etc., and provide information to the driver or autonomously/semi-autonomously perform a task when necessary (e.g., control of the vehicle), depending on the functionality of each feature.

For example, a curve speed assist feature is generally expected to take input from the sensors and assist the driver in slowing down the vehicle, whenever appropriate, while approaching a curved road. When approaching a curved road while driving a vehicle without ADAS, the driver must make several decisions regarding whether to decelerate the vehicle, how much to decelerate the vehicle, how fast to decelerate the vehicle, when to decelerate the vehicle, etc., depending on the current speed of the vehicle, the curvature of the road that the driver perceives, and current environmental conditions (e.g., wet road, low temperature, snow/ice on road, etc.). The driver also takes corrective action if the vehicle does not behave as expected due to various reasons related to the vehicle and the road.

For an ADAS feature to have a similar functionality, the system may use sensor information (e.g., from the front camera module) to detect lane markings on the road and execute a prediction algorithm that predicts the desired or target speed of the vehicle by considering various parameters and provides a deceleration command to the vehicle. It is also important to understand the operating conditions and interacting with the driver through the human-machine interface to convey the state of the feature.

Implementations herein include methods and systems to predict or determine an optimal or target lateral and/or longitudinal velocity profile for a vehicle based on upcoming or current curvature of a traffic lane the vehicle is currently traveling along and map data to provide appropriate deceleration while approaching a curved road segment to ensure the comfort of occupants of the vehicle (e.g., by limiting the maximum allowable jerk or lateral/longitudinal movement caused by rapid deceleration).

A vehicle sensing system and/or driver or driving assist system operates to capture sensor data (e.g., images) representative of the environment exterior of the vehicle and may process the captured sensor data to, for example, display images and/or detect objects at or near the vehicle and in the predicted path of the vehicle, such as to assist a driver of the vehicle in maneuvering the vehicle in a rearward direction. The driver assist system includes a processor or processing system that is operable to receive sensor data from one or more sensors (e.g., cameras, radar sensor, a lidar sensor, etc.) and provide an output to a display device for displaying images representative of the captured sensor data. Optionally, the driver assist system may provide a display, such as a rearview display or a top down or bird's eye or surround view display or the like.

Referring now to the drawings and the illustrative embodiments depicted therein, a vehicle 10 includes a driver assist system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The driver assist system 12 may include a number of other sensors, such as corner radar sensors 22. The driver assist system 12 includes a control or electronic control unit (ECU) 18 having electronic circuitry and associated software, with the electronic circuitry including a data processor or image processor that is operable to process sensor data captured by the sensors, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The driver assist system enables execution of longitudinal control of the vehicle in response to curved road segments within the operating conditions of the curved speed assist feature. Upon activation of the feature, the system generates a desired or target velocity profile for the upcoming road ahead of the equipped vehicle based on the sensor input when all operating conditions are met. The system may handle varying lengths of different lane markings, different lane marking availability, and varying map data before predicting the desired velocity profile. Based on the predicted target velocity profile, the system is capable of enabling longitudinal control of the vehicle (i.e., the system controls the vehicle directly or provides commands to another system capable of controlling the vehicle) to ensure the vehicle maintains the velocity profile. To achieve this, the system determines the deceleration command based on various factors such as a current state of the vehicle, inputs from the driver, comfort, etc.

Figure 2:
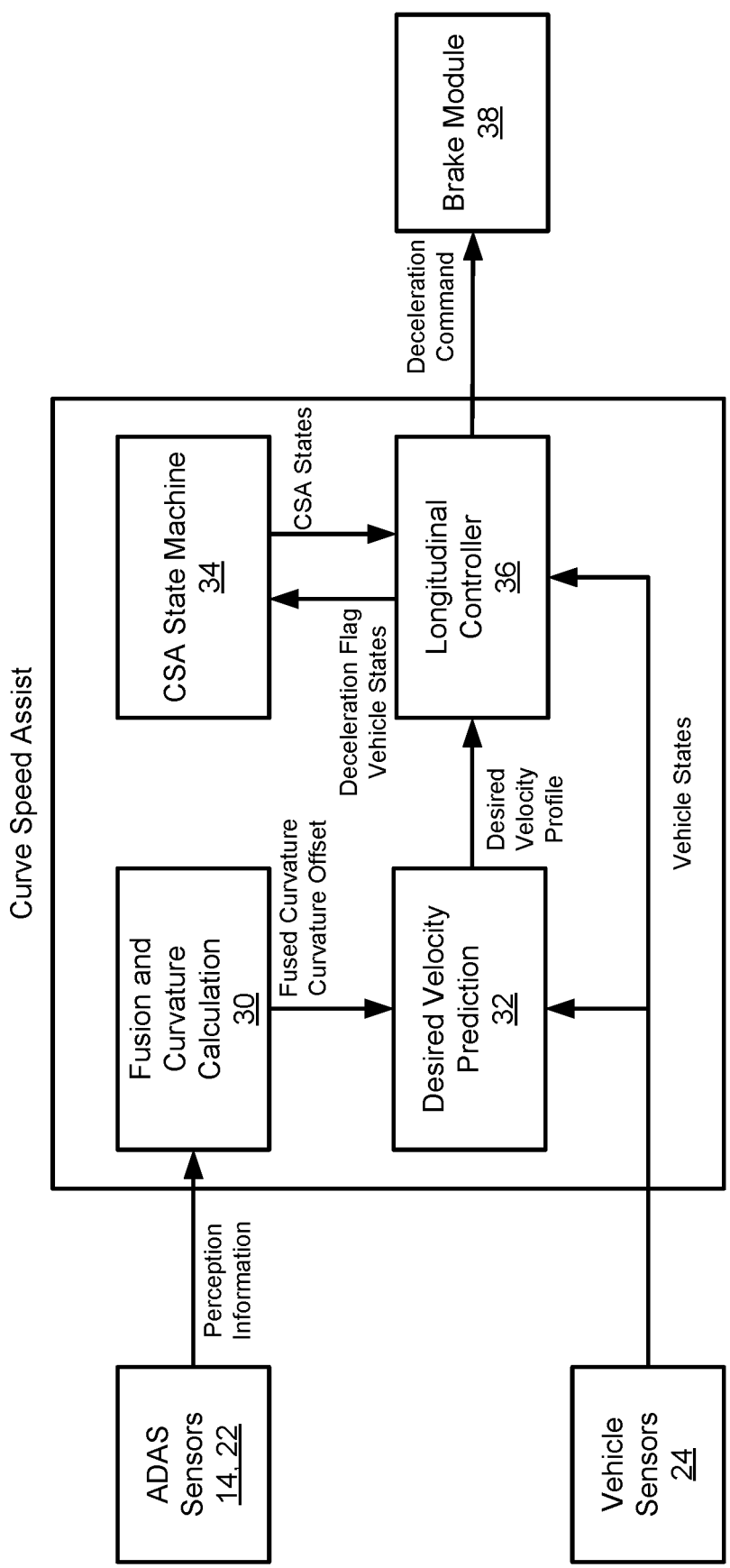
FIG. 2 is a block diagram of the vehicular driver assist system of FIG. 1.

Referring now to FIG. 2, in some examples, the system determines a curvature of the road ahead of the equipped vehicle (i.e., an upcoming curve to the left or the right of the traffic lane the equipped vehicle is currently traveling along) by using, for example, both (i) lane data determined based on image data captured from a front viewing camera and (ii) map data (e.g., stored at the vehicle or retrieved wirelessly from a user device of an occupant of the vehicle or a remote server via the Internet) to combine the advantages of the high availability of map data and the resolution of the lane data. That is, the system determines the curvature based on both lane data determined from image data captured by a camera and from map data. For example, the system fuses or combines or compares the image data and the map data to determine the curvature. A lookup table may predict or determine the desired velocity profile by selecting the desired lateral acceleration corresponding to the curvature profile of the road and current velocity of the equipped vehicle (and optionally based on other conditions, such as environmental conditions). This data may be used to calculate or determine the necessary deceleration to limit the maximum deceleration and the maximum jerk that can be caused by the feature which helps ensure the comfort of the occupants of the vehicle. By following these constraints, the system determines a deceleration command by accounting for a lookahead parameter. The system may include a feedforward controller (e.g., a proportional-integral-derivative (PID) controller) to accommodate unknown disturbances.

As shown in the block diagram of FIG. 2, the system includes one or more ADAS sensors, such as the cameras 14 and/or radar sensors 22 and/or lidar sensors. These sensors sense the surroundings of the equipped vehicle and provide perception information to the system (e.g. data derived from captured image data, radar data, lidar data, etc.). For example, a front camera module may provide lane markings information to the system and a GPS sensor (combined with map data or a map database) may provide waypoint information to a fusion and curvature estimation module 30. The system may include one or more vehicle sensors 24, such as wheel speed sensors, accelerometers, etc. These sensors provide vehicle state information such as vehicle speed, longitudinal acceleration, lateral acceleration, etc.

The fusion and curvature calculation or estimation module 30 receives the perception information from the ADAS sensors and may perform a validity check on the lane marking data based on the range of each of the markings. Based on the validity check, the module 30 may select a particular lane marking visible in the perception information. The module may determine or calculate curvature of the lane based at least in part on the analytical first and second derivatives of the selected lane marking (e.g., curve fitting). The module may also extract the necessary curvature information at various lookahead points (e.g., one or more predefined distances ahead of the vehicle) from the map data based on the current position of the vehicle (e.g., obtained via a GPS sensor), the current speed of the vehicle, etc. The module may also fuse the curvature and any curvature offset from the lane information and map information.

The system may also include a desired velocity prediction module 32. This module receives the fused curvature and fused curvature offset from the fusion and curvature estimation block 30 and the velocity of the equipped vehicle from the vehicle sensors 24. The module 32 generates or determines the desired or target velocity profile. For example, the desired velocity prediction module 32 includes a lookup table (e.g., a 2D lookup table) to select the desired lateral acceleration corresponding to the current velocity of the equipped vehicle and/or the curvature of each of the offset points. Other factors may affect the lookup, such as environmental conditions (e.g., temperature, precipitation, etc.), a posted speed limit, surrounding traffic, etc.

Optionally, the system includes a state machine module 34. The state machine module 34 receives the vehicle state and deceleration flags from a longitudinal controller 36 to switch the system between states. For example, the state machine module 34 may switch between an off or disabled state, a standby state, an active state, a ramp up state, and/or an override state. The transition between the states may be governed by several conditions such as availability of lanes, availability of map information, driver override, Adaptive Cruise Control (ACC) State, vehicle states, etc. The longitudinal controller 36 receives the vehicle state (i.e., from the vehicle sensors 24), the current system state (i.e., from the state machine module 34), and desired velocity profile (i.e., from the desired velocity prediction module 32) to provide a deceleration command to the brake module 38.

The longitudinal controller generates a high or strong deceleration flag when the velocity profile demands a higher deceleration than the maximum allowed value. The longitudinal controller may determine the deceleration required between each of the offset points relative to the velocity of the equipped vehicle and readjusts the deceleration when the deceleration is greater than the maximum allowed value (e.g., by increasing the distance at which the vehicle starts decelerating). That is, the system may begin decelerating sooner in order to avoid exceeding a maximum deceleration limit or threshold.

The longitudinal controller may include a PID based feedback loop to account for unknown disturbances. The longitudinal controller outputs the deceleration command such that the jerk (i.e., the lateral and/or longitudinal movement resulting from deceleration and/or turning) experienced by occupants of the vehicle is never greater than a threshold or maximum limit. The limit may be static and predetermined by a manufacturer, an owner, or an operator of the vehicle (e.g., set in response to a user input preference). Optionally, the limit may be dynamic and adjustable based on occupants of the vehicle (e.g., based on identities or sizes of the occupants) or based on environmental conditions around the vehicle. For example, when the system determines that a young child or an elderly person is present in the vehicle (e.g., via image data captured by an interior camera, based on a seat weight sensor, based on a profile for the occupant, and/or based on a user selection), the system may dynamically lower the limit.

Optionally, limits may be based on profiles associated with occupants of the vehicle. For example, the system may retrieve profiles associated with each occupant of the vehicle to determine a preferred dynamic limit of lateral or longitudinal forces (e.g., jerk) for each occupant. The system may set the limit based on the lowest limit from the profiles of each occupant. The system may retrieve the occupants' profiles based on facial recognition techniques (e.g., via an interior camera), via user selection, via identification of mobile devices (e.g., mobile phones, key fobs, etc.), or any other suitable method.

The system may dynamically lower the limit or threshold in, for example, poor environmental conditions (which may be determined via, for example, image data captured by the camera, temperature sensors and the like, or weather data correlated with the map data). The brake module 38 represents any hardware and/or software of the brake system that executes the deceleration command provided from the longitudinal controller 36.

Thus, the sensor system provides an ADAS curve speed assist feature that uses one or more ADAS sensors to control longitudinal motion of an equipped vehicle by generating a deceleration command in response to current or upcoming road curvature. The ADAS curve speed assist feature may include a fusion and curvature calculation/estimation module, a desired velocity prediction module, a longitudinal controller module, and/or a state machine module in order to verify the validity of lane markings, extract map data, determine the curvature of a select lane marking, and fuse the determined curvature with map data. The system may also determine or predict the desired velocity of the equipped vehicle based on a current state of the equipped vehicle (e.g., current lateral velocity, current longitudinal velocity, environmental considerations, etc.) and the fused curvature information. The system monitors the lateral (or longitudinal) acceleration of the equipped vehicle compared to the maximum allowable lateral (or longitudinal) acceleration (e.g., a static or dynamic maximum), driver override conditions through brake and throttle pedal override (e.g., the driver overriding the system via engaging the throttle and/or the brake), and/or availability of map and lane data. The system generates a deceleration profile using the desired velocity profile by considering maximum deceleration and jerk limits (i.e., lateral and/or longitudinal acceleration/deceleration limits) and outputs a deceleration command based on the lookahead time. The system may be integrated with an ACC feature of the equipped vehicle and operate synergistically with the cruise control and target following functionalities of the ACC feature.

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, the vehicular driving assist system comprising:
   a camera disposed at a vehicle equipped with the vehicular driving assist system and viewing forward of the equipped vehicle, wherein the camera is operable to capture image data;
   wherein the camera comprises a CMOS imaging array, and wherein the CMOS imaging array comprises at least one million photosensors arranged in rows and columns;
   an electronic control unit (ECU) comprising electronic circuitry and associated software;
   wherein image data captured by the camera is transferred to and is processed at the ECU;
   wherein the electronic circuitry of the ECU comprises an image processor operable to process image data captured by the camera and transferred to the ECU;
   wherein the vehicular driving assist system, while the equipped vehicle is traveling along a traffic lane of a road and responsive to processing at the ECU of image data captured by the camera and transferred to the ECU, determines lane markings of the traffic lane of the road along which the equipped vehicle is traveling;
   wherein the vehicular driving assist system determines curvature of the traffic lane of the road ahead of the equipped vehicle based on (i) curvature of the determined lane markings and (ii) map data representative of a current geographical location of the equipped vehicle;

wherein the vehicular driving assist system, based at least in part on the determined curvature of the traffic lane of the road ahead of the equipped vehicle, determines a target velocity profile that establishes a target lateral velocity for the equipped vehicle to follow as the equipped vehicle travels along the traffic lane of the road;

wherein, based at least in part on the determined target velocity profile, the vehicular driving assist system decelerates the equipped vehicle to follow the target velocity profile as the equipped vehicle travels along the traffic lane of the road; and wherein lateral acceleration of the equipped vehicle, as the equipped vehicle travels along the traffic lane of the road following the target velocity profile, remains below a maximum allowable lateral acceleration.

2. The vehicular driving assist system of claim 1, wherein the vehicular driving assist system determines the curvature of the traffic lane of the road ahead of the equipped vehicle based on a fusion of (i) a first curvature determined responsive to processing at the ECU of the image data captured by the camera and transferred to the ECU and (ii) a second curvature determined from the map data.

3. The vehicular driving assist system of claim 1, wherein the vehicular driving assist system determines the lane markings of the traffic lane of the road along which the equipped vehicle is traveling based on selection of particular lane markings, and wherein the selection of the particular lane markings is based on validity checks of the lane markings of the traffic lane.

4. The vehicular driving assist system of claim 1, wherein the vehicular driving assist system determines curvature of the determined lane markings based on a derivative of the lane marking.

5. The vehicular driving assist system of claim 1, wherein the vehicular driving assist system determines the target velocity profile using (i) a lookup table, (ii) a current velocity of the equipped vehicle, and (iii) the determined curvature of the traffic lane of the road ahead of the equipped vehicle.

6. The vehicular driving assist system of claim 1, wherein the vehicular driving assist system determines the target velocity profile based in part on the maximum allowable lateral acceleration.

7. The vehicular driving assist system of claim 6, wherein the maximum allowable lateral acceleration is configurable.

8. The vehicular driving assist system of claim 6, wherein the maximum allowable lateral acceleration is based on identification of occupants of the equipped vehicle.

9. The vehicular driving assist system of claim 6, wherein the maximum allowable lateral acceleration is determined based on a profile associated with an occupant of the equipped vehicle.

10. The vehicular driving assist system of claim 9, wherein the vehicular driving assist system determines an individual maximum allowable lateral acceleration based on the respective profile for each occupant of a plurality of occupants of the equipped vehicle, and wherein the maximum allowable lateral acceleration is determined based on the lowest individual maximum allowable lateral acceleration based on the respective profiles of the plurality of occupants.

11. The vehicular driving assist system of claim 1, wherein the vehicular driving assist system generates a deceleration command to decelerate the equipped vehicle using a proportional-integral-derivative (PID) controller.

12. The vehicular driving assist system of claim 1, wherein the vehicular driving assist system is part of an automated cruise control (ACC) system.

13. The vehicular driving assist system of claim 1, wherein the vehicular driving assist system determines the map data representative of the current geographical location of the equipped vehicle based on an output of a GPS sensor of the equipped vehicle.

14. The vehicular driving assist system of claim 1, wherein the camera is disposed at a windshield of the equipped vehicle and views through the windshield and forward of the equipped vehicle.

15. A vehicular driving assist system, the vehicular driving assist system comprising:

a camera disposed at a vehicle equipped with the vehicular driving assist system and viewing forward of the equipped vehicle, wherein the camera is operable to capture image data;

wherein the camera comprises a CMOS imaging array, and wherein the CMOS imaging array comprises at least one million photosensors arranged in rows and columns;

an electronic control unit (ECU) comprising electronic circuitry and associated software;

wherein image data captured by the camera is transferred to and is processed at the ECU;

wherein the electronic circuitry of the ECU comprises an image processor operable to process image data captured by the camera and transferred to the ECU;

wherein the vehicular driving assist system, while the equipped vehicle is traveling along a traffic lane of a road and responsive to processing at the ECU of image data captured by the camera and transferred to the ECU, determines lane markings of the traffic lane of the road along which the equipped vehicle is traveling;

wherein the vehicular driving assist system determines curvature of the traffic lane of the road ahead of the equipped vehicle based on (i) curvature of the determined lane markings and (ii) map data representative of a current geographical location of the equipped vehicle;

wherein the vehicular driving assist system, based at least in part on the determined curvature of the traffic lane of the road ahead of the equipped vehicle, determines a target velocity profile that establishes a target lateral velocity for the equipped vehicle to follow as the equipped vehicle travels along the traffic lane of the road;

wherein the vehicular driving assist system determines the target velocity profile using (i) a lookup table, (ii) a current velocity of the equipped vehicle, and (iii) the determined curvature of the traffic lane of the road ahead of the equipped vehicle, and wherein, the vehicular driving assist system determines the target velocity profile based in part on a maximum allowable lateral acceleration;

wherein, based at least in part on the determined target velocity profile, the vehicular driving assist system decelerates the equipped vehicle to follow the target velocity profile as the equipped vehicle travels along the traffic lane of the road; and wherein lateral acceleration of the equipped vehicle, as the equipped vehicle travels along the traffic lane of the road following the target velocity profile, remains below the maximum allowable lateral acceleration.

16. The vehicular driving assist system of claim 15, wherein the vehicular driving assist system determines the curvature of the traffic lane of the road ahead of the equipped vehicle based on a fusion of (i) a first curvature determined responsive to processing at the ECU of the image data captured by the camera and transferred to the ECU and (ii) a second curvature determined from the map data.

17. The vehicular driving assist system of claim 15, wherein the vehicular driving assist system determines the lane markings of the traffic lane of the road along which the equipped vehicle is traveling based on selection of particular lane markings, and wherein the selection of the particular lane markings is based on validity checks of the lane markings of the traffic lane.

18. The vehicular driving assist system of claim 15, wherein the vehicular driving assist system determines curvature of the determined lane markings based on a derivative of the lane marking.

19. A vehicular driving assist system, the vehicular driving assist system comprising:
 a camera disposed at a vehicle equipped with the vehicular driving assist system and viewing forward of the equipped vehicle, wherein the camera is operable to capture image data;
 wherein the camera comprises a CMOS imaging array, and wherein the CMOS imaging array comprises at least one million photosensors arranged in rows and columns;
 an electronic control unit (ECU) comprising electronic circuitry and associated software;
 wherein image data captured by the camera is transferred to and is processed at the ECU;
 wherein the electronic circuitry of the ECU comprises an image processor operable to process image data captured by the camera and transferred to the ECU;
 wherein the vehicular driving assist system, while the equipped vehicle is traveling along a traffic lane of a road and responsive to processing at the ECU of image data captured by the camera and transferred to the ECU, determines lane markings of the traffic lane of the road along which the equipped vehicle is traveling;
 wherein the vehicular driving assist system determines curvature of the traffic lane of the road ahead of the equipped vehicle based on a fusion of (i) curvature of the determined lane markings and (ii) map data representative of a current geographical location of the equipped vehicle;
 wherein the vehicular driving assist system, based at least in part on the determined curvature of the traffic lane of the road ahead of the equipped vehicle, determines a target velocity profile that establishes a target lateral velocity for the equipped vehicle to follow as the equipped vehicle travels along the traffic lane of the road;
 wherein the vehicular driving assist system determines the target velocity profile based in part on a maximum allowable lateral acceleration;
 wherein the maximum allowable lateral acceleration is based at least in part on identification of a driver of the equipped vehicle;
 wherein, based at least in part on the determined target velocity profile, the vehicular driving assist system decelerates the equipped vehicle to follow the target velocity profile as the equipped vehicle travels along the traffic lane of the road; and
 wherein lateral acceleration of the equipped vehicle, as the equipped vehicle travels along the traffic lane of the road following the target velocity profile, remains below the maximum allowable lateral acceleration.

20. The vehicular driving assist system of claim 19, wherein the maximum allowable lateral acceleration is determined based on a profile associated with the driver of the equipped vehicle.

21. The vehicular driving assist system of claim 20, wherein the vehicular driving assist system determines an individual maximum allowable lateral acceleration based on the respective profile for each occupant of a plurality of occupants of the equipped vehicle, and wherein the maximum allowable lateral acceleration is determined based on the lowest individual maximum allowable lateral acceleration based on the respective profiles of the plurality of occupants.

22. The vehicular driving assist system of claim 19, wherein the vehicular driving assist system is part of an automated cruise control (ACC) system.

* * * * *